Sept. 19, 1961 G. D. WEBBER 3,000,103
GAGE BLOCK VERIFICATION INSTRUMENT AND PROCEDURE
Filed May 18, 1959
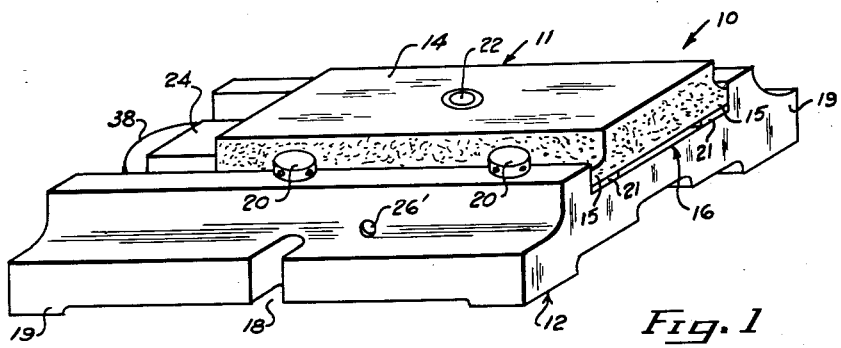
Fig. 1
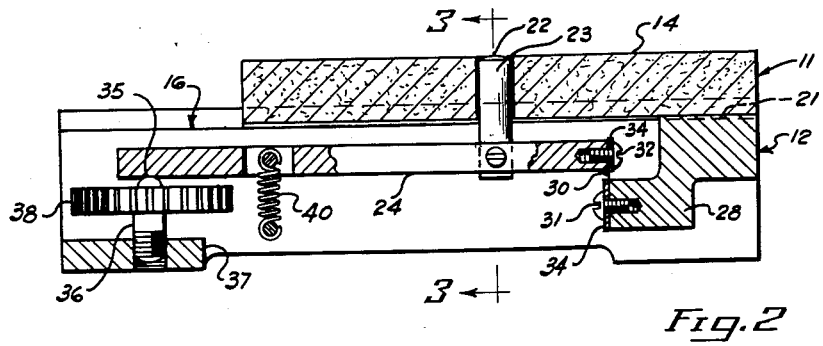
Fig. 2
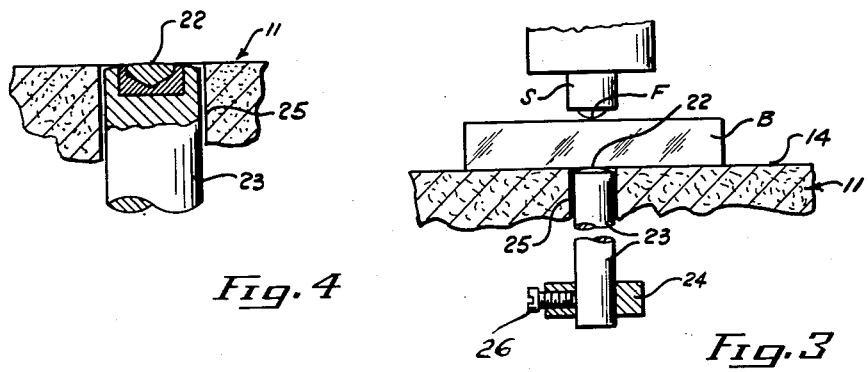
Fig. 4
Fig. 3
INVENTOR.
GEORGE D. WEBBER
BY George M. Soule
ATTORNEY United States Patent Office  3,000,103
Patented Sept. 19, 1961

3,000,103
GAGE BLOCK VERIFICATION INSTRUMENT AND PROCEDURE
George D. Webber, Lakewood, Ohio, assignor, by mesne assignments, to Webber Gage Company, Cleveland, Ohio, a corporation of Ohio
Filed May 18, 1959, Ser. No. 813,891
1 Claim. (Cl. 33—147)

Gage blocks, despite exercise of reasonable care in protecting them from misuse, eventually become damaged or worn to such extent that professional inspection of their represented distance-identifying values is necessary for verification and/or classification or grading according to accepted fiducial standards. A commonly practiced method of inspection is to place a "master" block firmly on a supposedly clean and acceptably "flat" surface (e.g. of a high finish inspection surface plate) beneath the feeler of a comparator instrument to set that instrument to the required distance above the inspection surface. Then the gage blocks to be inspected are placed in position on such surface below the feeler and the test is made by inspection, via the indicator dial of the comparator, as well understood in the art.

During the inspection procedure particles of dust deposited on the supporting surface or on the gage block can elevate one end or side of the master block or of the blocks can be inspected, resulting in inaccurate indications on the comparator dial of the actual fiducial dimensions of the gage blocks. Further, if the gage block to be inspected has become ever so slightly warped and it is laid concave-side-down on the supporting surface it may be "found oversize," whereas it can be shown to be of represented dimensions when measured by a sufficiently precise instrument operatingly similar to a micrometer. Additionally when a gage block is supported on one side on a non-yieldable or stationary supporting metal surface the trained sense of feel on part of skilled persons such as exercised when two gage blocks are "wrung" together, as customarily held between the hands, is independable from the standpoint of securing oil films of uniform thickness comparable to the films existing when gage blocks are properly wrung together by skilled persons in the customary way. Relieving of the supporting surface of the measuring table as by provision of a series of grooves on the fixed supporting surface is only a partial solution to the problem because a thus relieved supporting metal surface can become generally concave at critical areas in a relatively short time with obviously undesirable results. Additionally if a metallic inspection table surface is purposely "flat," then the gage blocks to be inspected will tend to adhere thereto if firmly pressed against it, making it difficult to remove the gage blocks therefrom after inspection.

The present instrument and procedure enables quick and accurate checking of actual "represented" dimensions of gage blocks, with a practical minimum of possible error due to presence of dust and oil and existence of slight warpage on part of the gage blocks to be inspected. Warpage is, of course, undesirable in gage blocks but can be detected by ordinary methods (e.g. measuring of the blocks first resting on a generally flat surface "one-side-up" and then resting on the same surface the "other-side-up."

The accompanying drawing shows the preferred form of instrument for carrying out the present procedure of inspecting gage blocks or the fiducial dimensions of similar rigid members having supposedly flat parallel surfaces on opposite sides.

FIG. 1 is a perspective view of the present subject instrument 10. FIG. 2 is a longitudinally central sectional view thereof.

FIG. 3 is a transverse sectional view as indicated at 3—3 of FIG. 2, showing a gage block in position for inspection and, additionally, the feeler portion of a comparator or its equivalent, not fully shown.

FIG. 4 is an enlarged fragmentary sectional view of an anvil member of the present subject instrument (e.g. same as though taken at 3—3 on FIG. 2).

In FIG. 1 a measuring table, 11, mounted on a suitable rigid metal base or frame 12, preferably comprises a rigid block of high fusion temperature ceramic material such, for example, as aluminum oxide having a substantially flat (e.g. ground) top surface 14 and relatively opposite base flange portions 15 occupying a complementary channel formation 16 of the frame 12. The frame 12 is suitably formed, for attachment as by screws or bolts, not shown, to the table of a comparator instrument, as will be apparent (e.g. at bolt or screw slots 18, one shown, on opposite flange portions 19 of the base).

The measuring table 11 is stably secured to the base 12 by three screws 20 (known 3-point support, two of the screws being shown). The three screws 20 clamp the flange portions 15 of the measuring table against thin supporting non-metallic or somewhat yieldable strips or pads 21 resting on the bottom surface of channel 16 of the base, so that the table cannot rock on its support during the gage block inspection operations.

The anvil member 22 (see FIG. 4) of the instrument 10 is supported rigidly on a post portion 23 of a generally horizontal elevating bar or lever 24 within the base, the post portion 23 extending with adequate working clearance through a vertical opening 25 in the measuring table 11 and being rigidly secured to the elevating bar or lever as by a set screw 26, FIG. 3. The set screw 26 is accessible for assembly purposes through a hole 26', FIG. 1, in the frame 12.

The anvil member 22 is of highly wear resisting material (e.g. diamond) finished smoothly on a relatively large radius surface after being "set" into the top end of the post portion 23 as by conventional methods in machine tool practice.

The elevating bar or lever 24 is pivotally secured to the frame 12 as on a cross piece 28, the pivotal support preferably including a thin flexible leaf spring 30 secured as by a pair of screws 31 (one shown) to the cross piece 28 and, as by another pair of screws 32 (one shown), to one end of the lever 24. Rigid plates such as 34 with straight parallel proximal edges are preferably applied under the heads of the screws 31 to stabilize or direct the swinging or pivotal motion of the elevating bar while flexing the leaf spring.

Remotely of the anvil-supporting post 23 and of the pivot a spheroidal head portion 35 of an elevating screw 36, threaded into another cross bar portion 37 of the base 12, underlies the elevating lever 24 in contact therewith, so that, by manipulation of a wheel or disc portion 38 of the screw, the anvil 22 can be adjusted in very small increments relative to the top surface 14 of the measuring table 11. A suitable helical tension spring 40, secured as will be evident from FIG. 2, holds the elevating bar or lever 24 in firm contact with the head portion 35 of elevating screw 36.

The lengths of the essential portions of the elevating lever 24 and the number of threads per inch of the screw 36 are preferably of such design that a small angular movement (e.g. 10°) of the wheel portion 38 will accomplish an extremely small vertical adjustment of the anvil member 22.

*Operation*

Use of the instrument 10 may vary according to circumstances. The comparator feeler F, on spindle S, FIG. 3, is assumed to have a fully right line non-rotational support (as by use of a gib type guide) so that, after securing of the frame 12 to the comparator table, the feeler axis will remain in vertical alignment with the average positional axis of the anvil supporting post 23.

Assuming the topmost surface of the anvil 22 has been set slightly above the measuring table surface 14 (which can be ascertained by human feel in sliding a gage block or other test object across the surface 14 into contact with the anvil surface and noting the resistance to free sliding movement as the test object encounters the anvil surface, when it does after trial setting), a master gage block, corresponding to the dimension of the block or blocks to be inspected, is first slid into position over the anvil, and the dial of the comparator is then set at zero or other desired position with the feeler in contact with the master block surface. Then the gage block or blocks to be inspected are slid into inspecting position and their dimensional deviations (if any) from standard are noted by reference to the comparator dial.

It will be evident that presence of dust particles on either the gage blocks (one shown at B, FIG. 3) or on the measuring table surface 14 could not affect the accomplished measurements unless such dust particles were to be present substantially exactly on the axis of coincidence of anvil and feeler, which would be an extremely unlikely occurrence since inspection environment is usually free of air-suspended dust particles. Also it will be apparent that, within reasonable limits (i.e. for practical purposes), convexity of a gage block as by warpage would not affect a true inspection reading. The gage blocks, additionally, are easy to move into and out of inspection position on the relatively smooth, non-metallic table surface 14, and are easy to remove therefrom despite of a reasonable amount of oil film such as may be present on the gage blocks when subjected to inspection by use of the present instrument.

The instrument 10 hereof can of course be used in any position. Terms such as "vertical," "horizontal," "table" and the like, used herein, are for convenience only and not by way of scope limitation.

I claim:

A gage block inspection instrument comprising a rigid frame adapted to be mounted on a table of a comparator or the like adjacent the feeler thereof, a measuring table on the frame having a generally flat top surface adapted to support the gage blocks and having an opening therethrough, an anvil member having a high wear resisting convex top surface projecting through the opening toward such feeler, a lever supporting said anvil member and having a fixed pivot on the frame remotely of the anvil member in a direction generally parallel to said flat surface, an adjusting screw below the lever and thread-connected to the frame remotely of the anvil member in the opposite direction along the lever and having a convex top surface in contact with the lever, and a spring connecting the lever to the frame to hold the lever in contact with the convex surface of the screw.

References Cited in the file of this patent

UNITED STATES PATENTS

| | | |
|---|---|---|
| 1,422,161 | Woodrow | July 11, 1922 |
| 2,138,411 | Tornebohm | Nov. 29, 1938 |
| 2,230,485 | Dowdy et al. | Feb. 4, 1941 |
| 2,547,087 | Milligan | Apr. 3, 1951 |
| 2,826,818 | Roeger | Mar. 18, 1959 |